(12) United States Patent
Collins et al.

(10) Patent No.: US 9,559,561 B2
(45) Date of Patent: Jan. 31, 2017

(54) MOUNTING BASE FOR MOTOR/GENERATOR

(71) Applicant: Nidec Motor Corporation, St. Louis, MO (US)

(72) Inventors: Michael T. Collins, St. Louis, MO (US); Jeffrey S. Sherman, St. Louis, MO (US); Chetan O. Modi, St. Louis, MO (US); Craig E. Wallace, Brighton, IL (US); Payman Rassoolkhani, St. Louis, MO (US); Kent A. Sheeran, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 541 days.

(21) Appl. No.: 14/080,170

(22) Filed: Nov. 14, 2013

(65) Prior Publication Data
US 2015/0130314 A1 May 14, 2015

(51) Int. Cl.
*H02K 5/00* (2006.01)
*H02K 7/02* (2006.01)
(Continued)

(52) U.S. Cl.
CPC ....... *H02K 5/00* (2013.01); *H02K 7/02* (2013.01); *H02K 7/108* (2013.01); *H02K 7/086* (2013.01); *Y02E 60/16* (2013.01)

(58) Field of Classification Search
CPC .................................. H02K 5/00; H02K 5/24
(Continued)

(56) References Cited

U.S. PATENT DOCUMENTS 2,040,371 A * 5/1936 Gough ................... H02K 1/185
310/216.025
2,982,504 A * 5/1961 Feiertag ................... F16M 5/00
248/606
(Continued)

FOREIGN PATENT DOCUMENTS

DE 202013007635 U1 10/2013
EP 1119089 7/2001
(Continued)

OTHER PUBLICATIONS

European Search Report from European Application No. 2940842 entitled Mounting Base for Motor/Generator (Dated Nov. 13, 2015).

*Primary Examiner* — Jose Gonzalez Quinones
(74) *Attorney, Agent, or Firm* — Hovey Williams LLP

(57) ABSTRACT

A motor or generator assembly including a motor or generator machine and mounting structure supporting the machine on an appliance is provided. The machine presents an axially extending, radially outermost circumferential face and a pair of axially spaced apart, radially projecting axial margins. The mounting structure includes a pair of at least substantially radially extending plates and a base configured for connection to the appliance. The plates extend at least in part adjacent respective ones of the axial margins and at least in part define a machine-receiving space therebetween. The machine is mounted on the brackets so as to be positioned at least in part in the machine-receiving space. The base is positioned at least substantially radially outside the circumferential face of the machine and presents a pair of axially spaced apart side faces, with each of the plates being secured against a respective one of the side faces.

19 Claims, 14 Drawing Sheets

(51) Int. Cl.
*H02K 7/108* (2006.01)
*H02K 7/08* (2006.01)

(58) Field of Classification Search
USPC ............... 310/91, 406, 408, 410, 413, 415, 310/427–428
See application file for complete search history.

(56) References Cited

U.S. PATENT DOCUMENTS

| | | | |
|---|---|---|---|
| 3,983,429 A * | 9/1976 | Allardice, Jr. | H02K 5/26 310/91 |
| 4,033,531 A * | 7/1977 | Levine | F16M 7/00 248/558 |
| 5,711,404 A | 1/1998 | Lee | |
| 6,084,325 A | 7/2000 | Hsu | |
| 6,302,826 B1 | 10/2001 | Lee | |
| 6,661,136 B1 | 12/2003 | Lee | |
| 6,833,644 B1 | 12/2004 | Lee | |
| 7,678,022 B1 | 3/2010 | Hsieh | |
| 7,682,287 B1 | 3/2010 | Hsieh | |
| 7,732,961 B2 | 6/2010 | Lin | |
| 8,414,458 B2 | 4/2013 | Hsieh | |
| 8,414,459 B2 | 4/2013 | Hsieh | |
| 2004/0164630 A1 | 8/2004 | Gautier | |
| 2008/0020877 A1 | 1/2008 | Bogner | |
| 2009/0015083 A1 | 1/2009 | Hsieh | |
| 2014/0035414 A1 | 2/2014 | Hsieh | |

FOREIGN PATENT DOCUMENTS

| | | |
|---|---|---|
| EP | 2566016 | 3/2013 |
| TW | M303560 U | 12/2006 |
| WO | 2013014570 | 1/2013 |

* cited by examiner

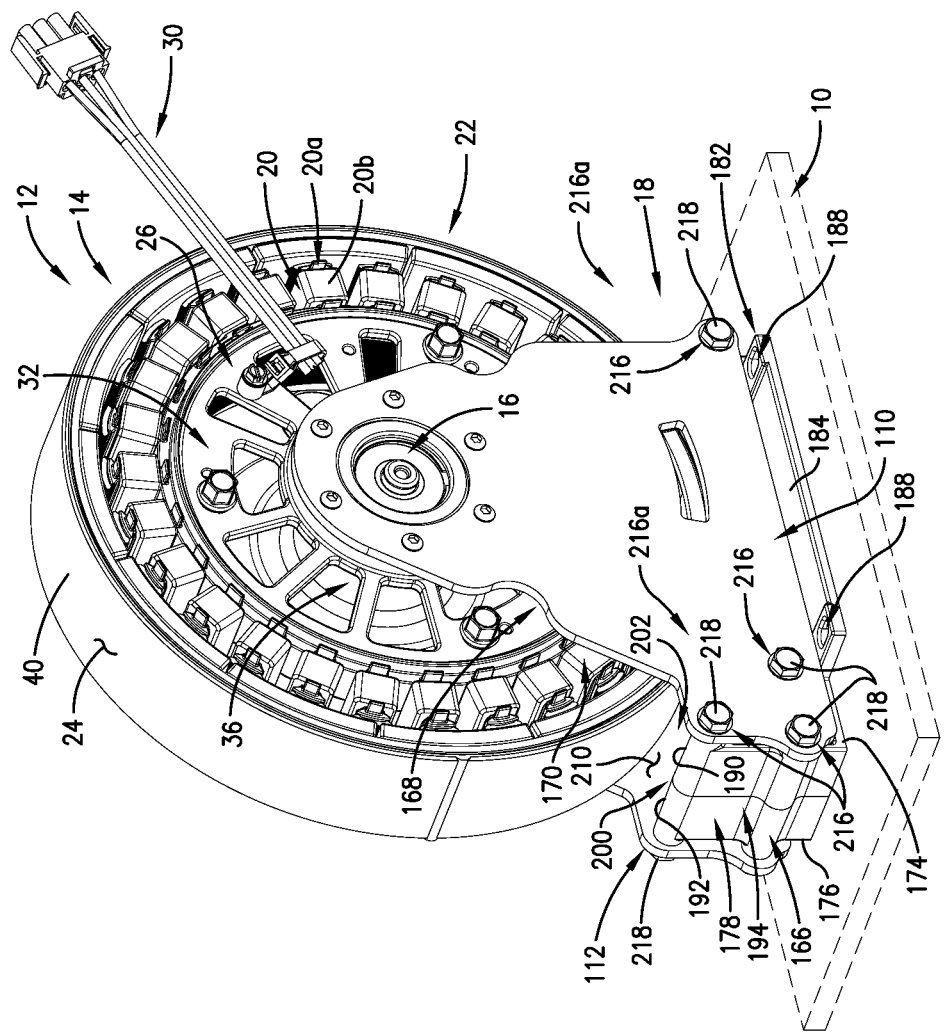

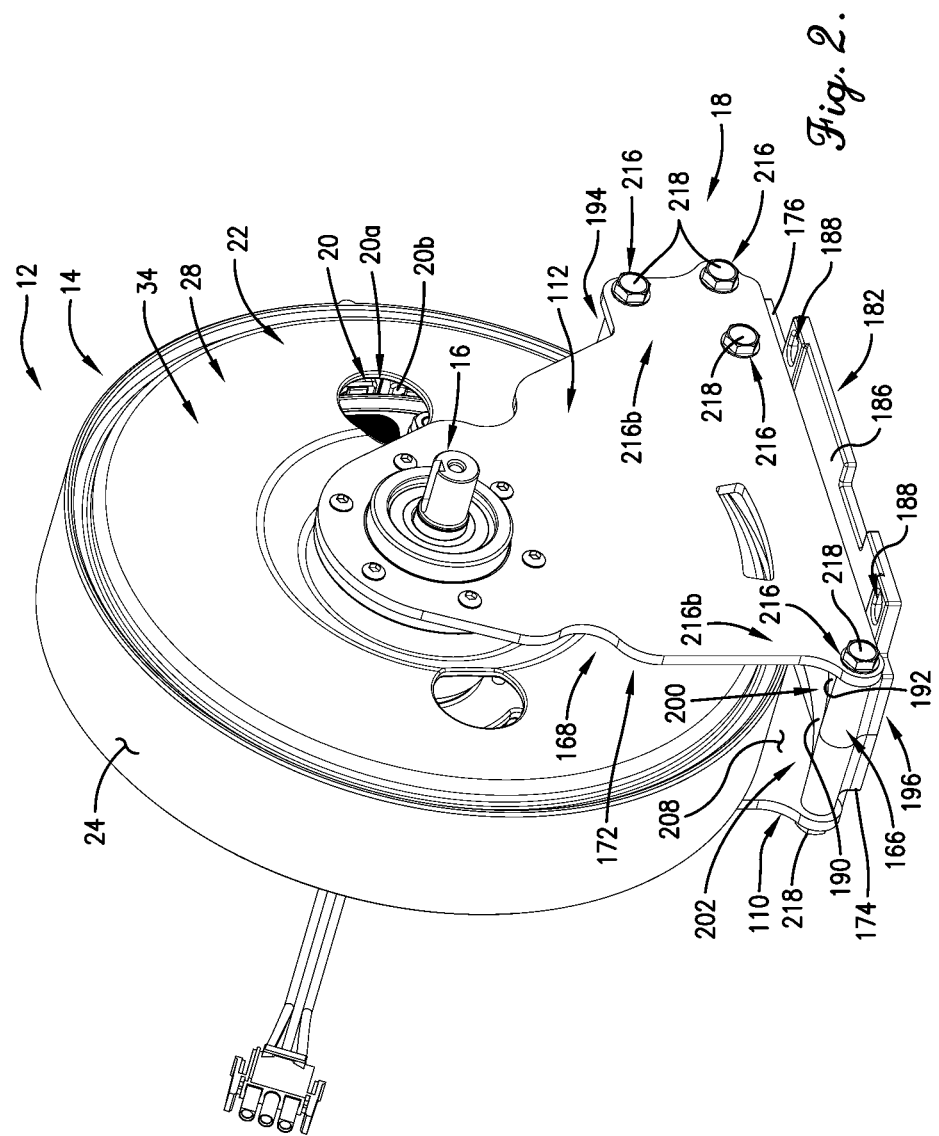

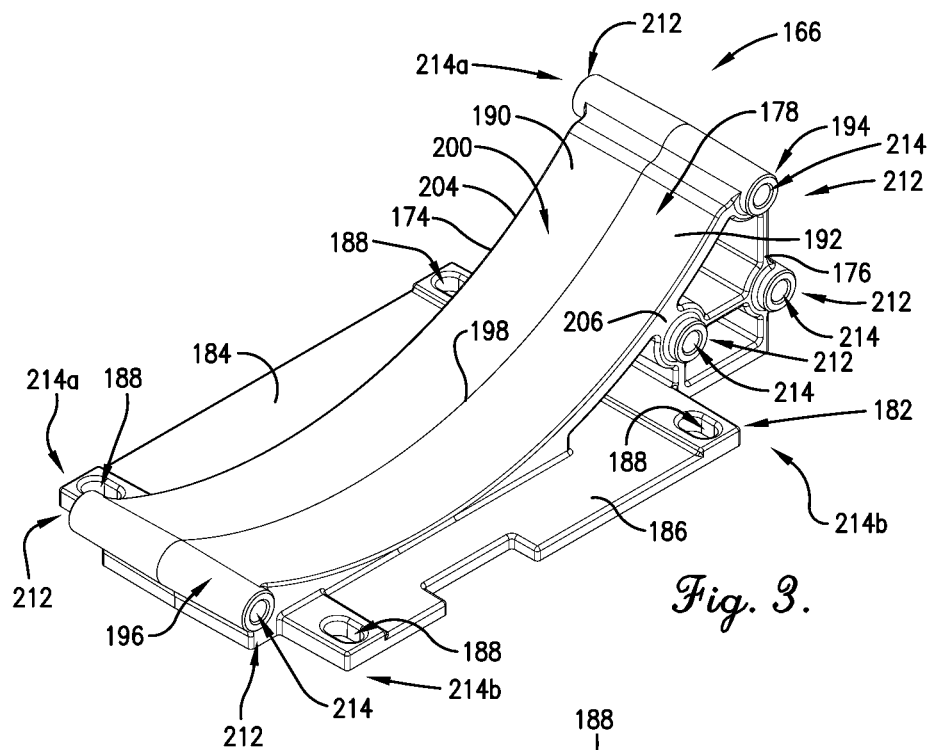
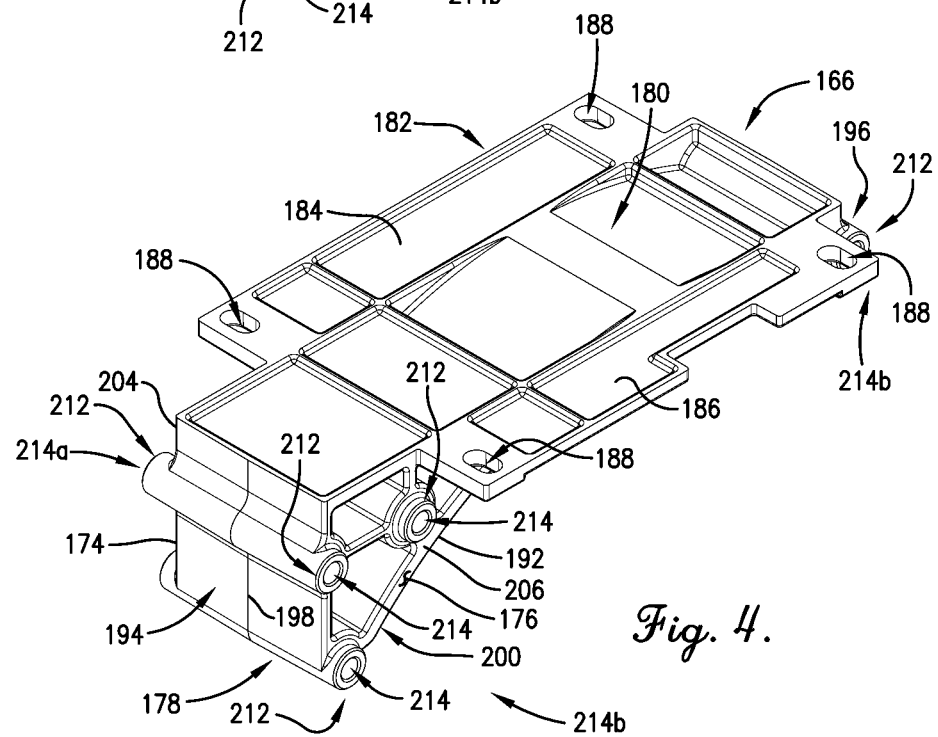

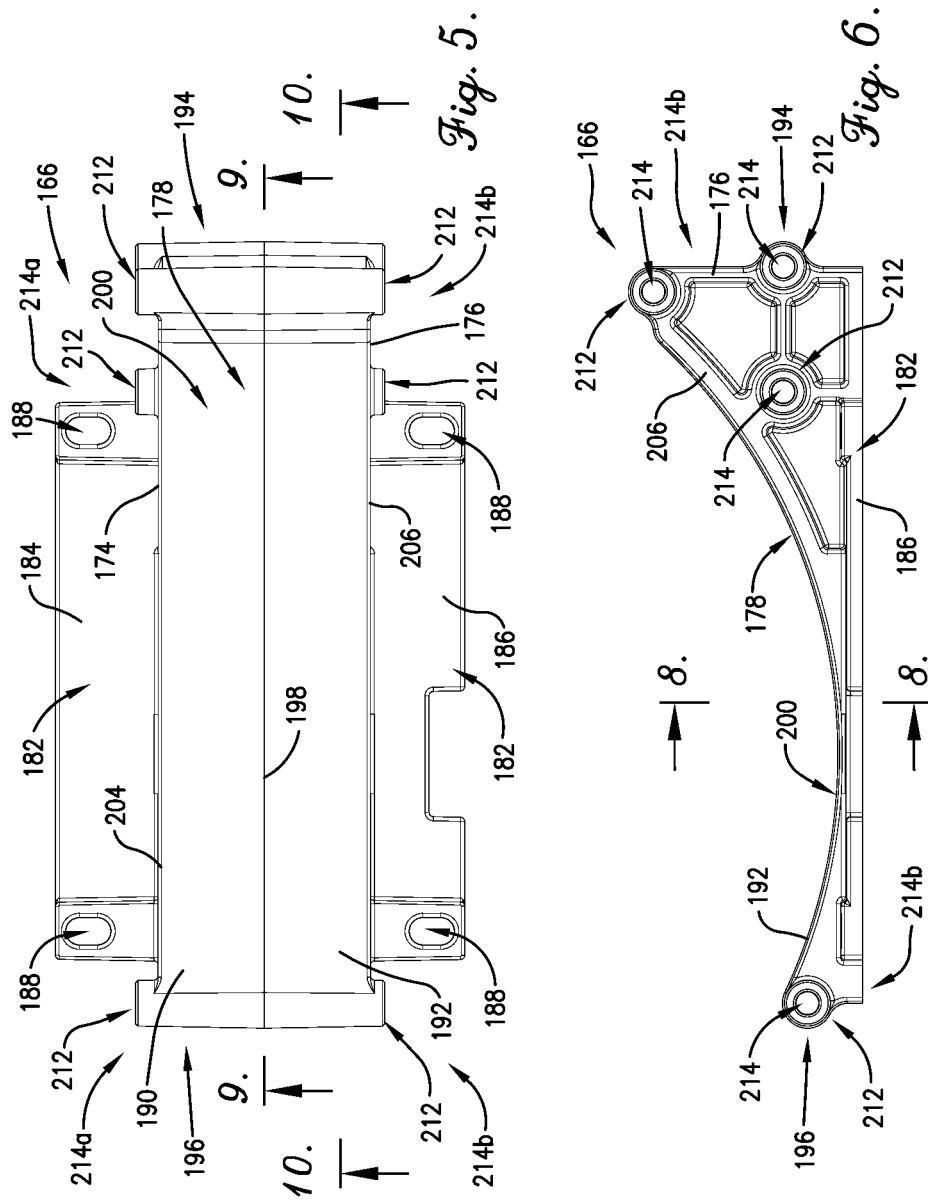

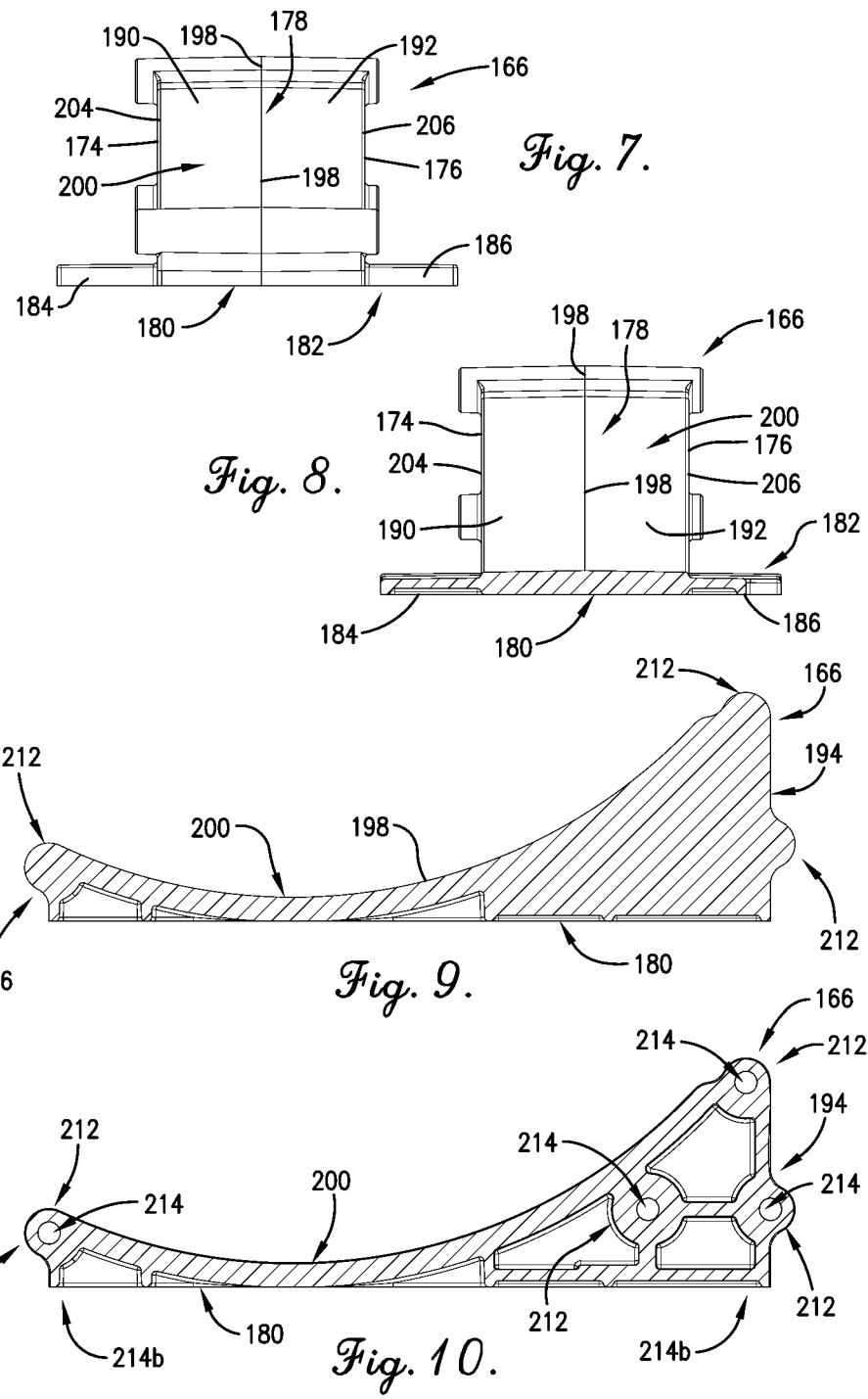

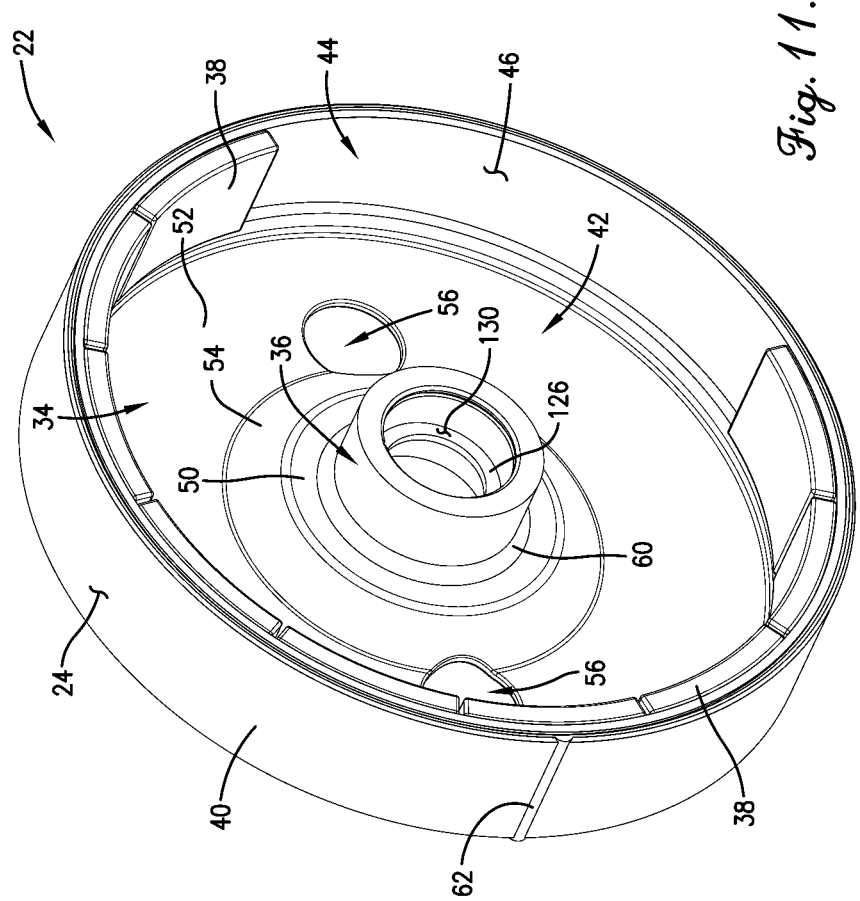

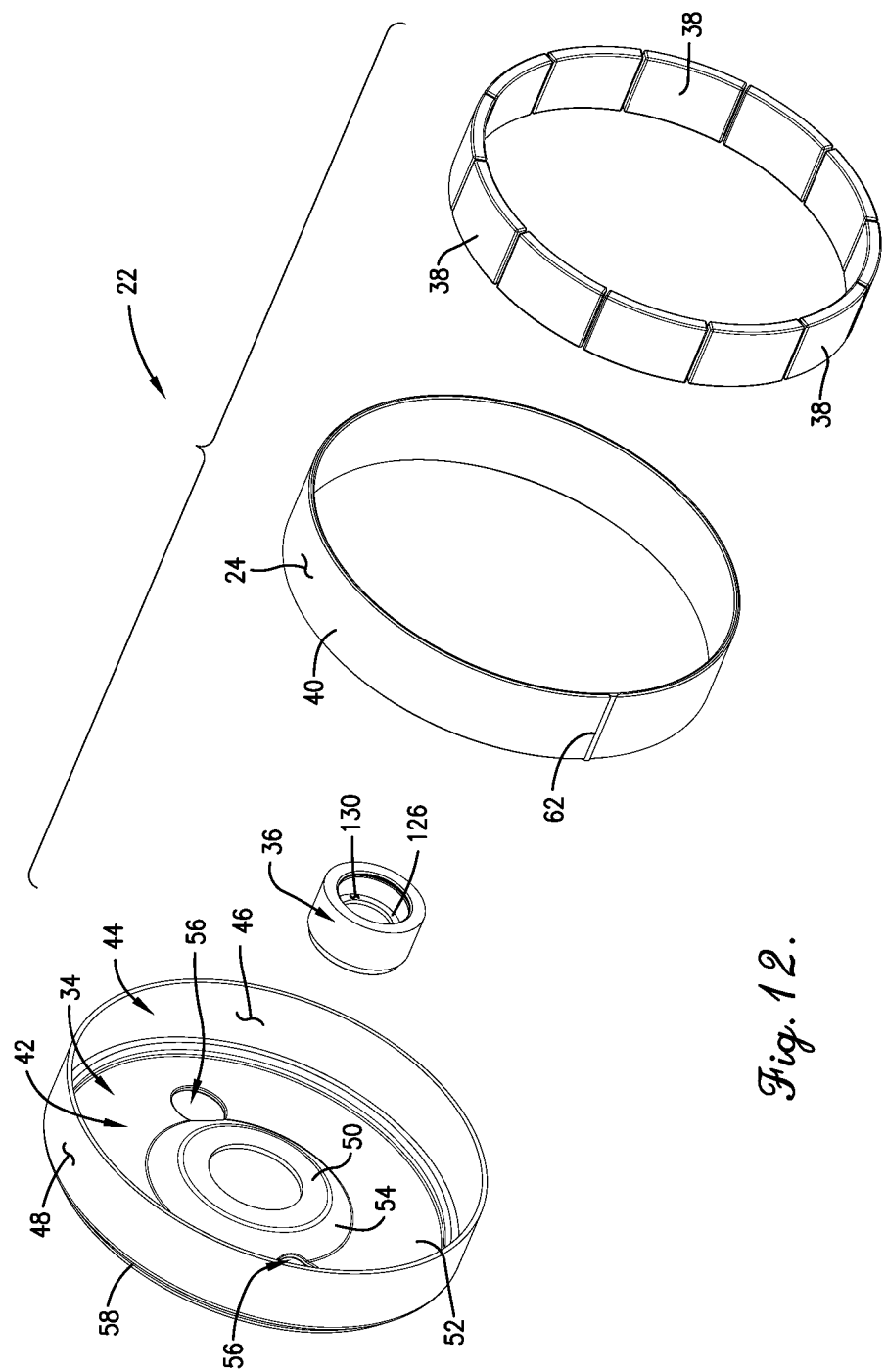

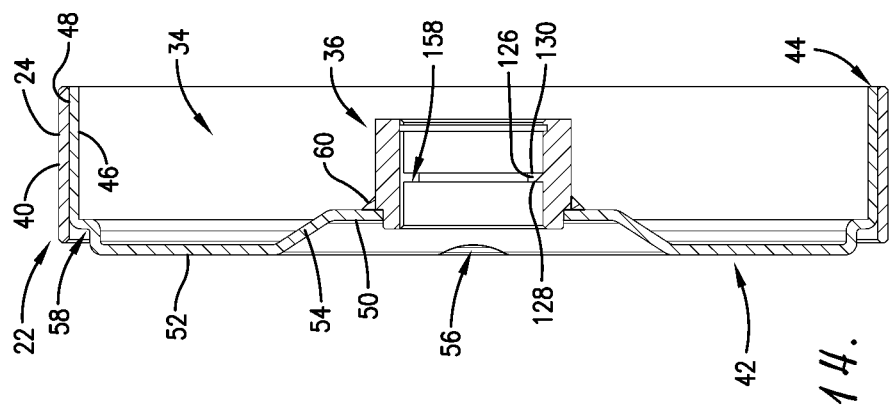
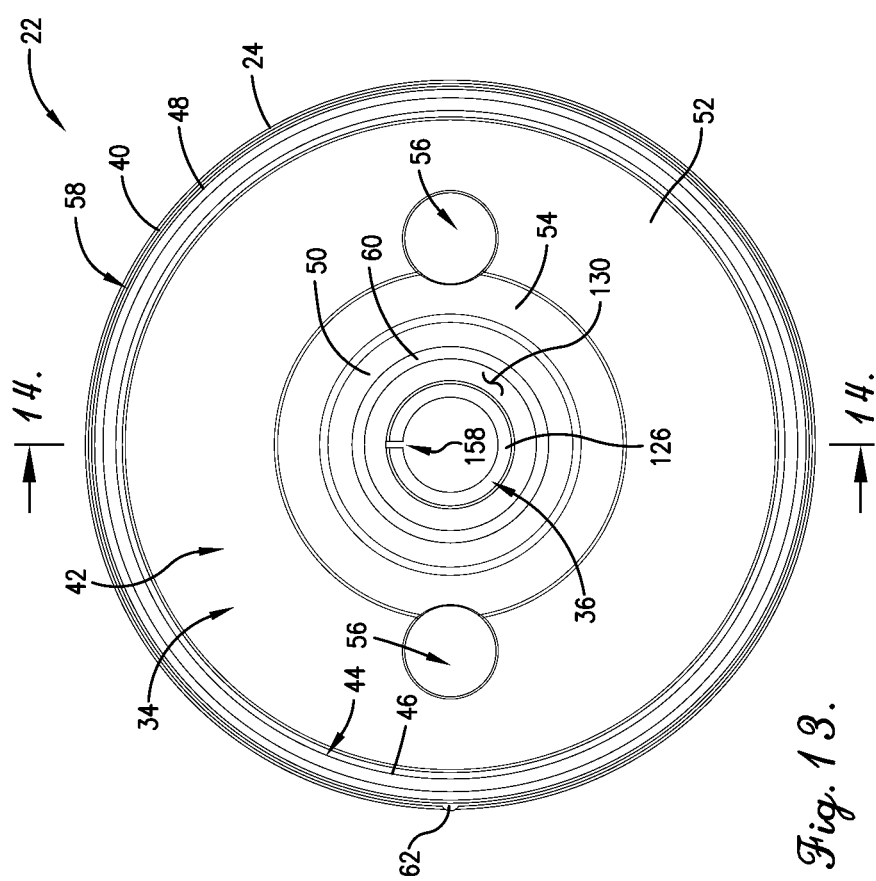

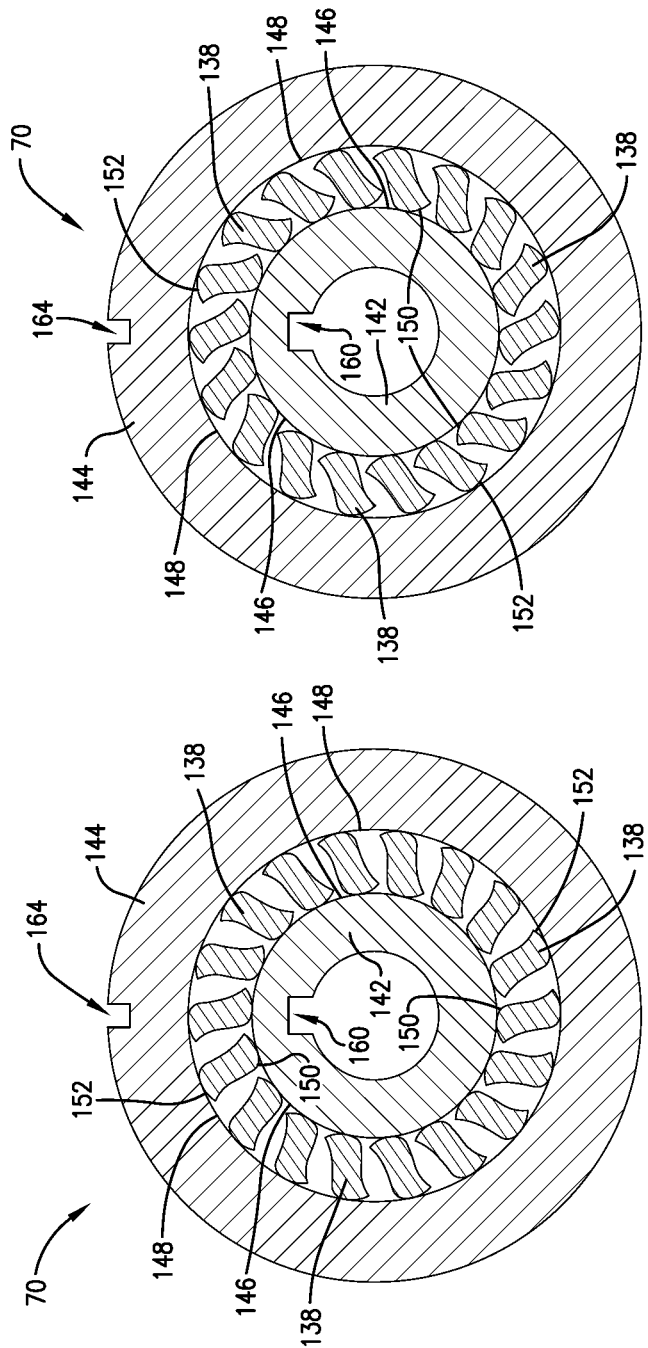

MOUNTING BASE FOR MOTOR/GENERATOR

BACKGROUND OF THE INVENTION

1. Field of the Invention

The present invention relates generally to an electric motor or generator assembly for use in an appliance. More specifically, the present invention concerns a mounting base for securing an electric motor or generator assembly in an appliance.

2. Discussion of the Prior Art

Those of ordinary skill in the art will appreciate that electric motors or generators are used in a variety of applications, including, but not limited to, appliances (such as exercise bicycles, rowing machines, ceiling fans, dishwashers, and washing machines) and vehicles (such as cars and golf carts). In an exercise bicycle, for instance, an electric generator might be provided. The generator is driven by the pedaling of a user and in turn supplies electricity to a display showing parameters such as the user's simulated speed or distance, the amount of time pedaled, et cetera.

Conventional mounting structure for supporting the motor or generator may include brackets or plates supporting the motor or generator. Time-consuming alignment of the brackets and shimming between the rotor and stator are often necessary during installation of the motor or generator on the appliance. A need therefore exists for a precisely formed mounting arrangement that can be created efficiently and cost-effectively and that minimizes the installation envelope required for the motor or generator assembly as a whole.

SUMMARY

According to one aspect of the present invention, a motor or generator assembly for use with an appliance is provided. The motor or generator assembly includes a motor or generator machine and mounting structure supporting the machine on the appliance. The machine includes a rotor rotatable about an axis, as well as a stator. The machine presents an axially extending, radially outermost circumferential face. The machine presents a pair of axially spaced apart axial margins, each of which projects generally radially inwardly from the circumferential face. The mounting structure includes a pair of at least substantially radially extending plates and a base. The plates at least in part define a machine-receiving space therebetween. The machine is mounted on the brackets so as to be positioned at least in part in the machine-receiving space. The plates extend at least in part adjacent respective ones of the axial margins. The base is positioned at least substantially radially outside the circumferential face of the machine. The base is configured for connection to the appliance. The base presents a pair of axially spaced apart side faces, with each of the plates being secured against a respective one of the side faces.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein:

FIG. 1 is a front perspective view of an appliance and an electric motor or generator assembly configured for use with the appliance;

FIG. 2 is a rear perspective view of the electric motor or generator assembly of FIG. 1;

FIG. 3 is an enlarged top, rear perspective view of the base of the assembly of FIGS. 1 and 2;

FIG. 4 is a bottom, front perspective view of the base of FIG. 3;

FIG. 5 is a top view of the base of FIGS. 3 and 4;

FIG. 6 is a side view of the base of FIGS. 3-5;

FIG. 7 is a back view of the base of FIGS. 3-6;

FIG. 8 is a back cross-sectional view of the base of FIGS. 3-7, taken along line 8-8 of FIG. 6;

FIG. 9 is a cross-sectional view of the base of FIGS. 3-8, taken along line 9-9 of FIG. 5;

FIG. 10 is a cross-sectional view of the base of FIGS. 3-9, taken along line 10-10 of FIG. 5;

FIG. 11 is a front perspective view of the rotor of the assembly of FIGS. 1 and 2, with several magnets removed;

FIG. 12 is an exploded front perspective view of the rotor of FIG. 11, but with all of the magnets illustrated;

FIG. 13 is a side view of the rotor of FIG. 12;

FIG. 14 is a cross-sectional view the rotor of FIGS. 12 and 13, taken along line 14-14 of FIG. 13;

FIG. 20 is a cross-sectional side view of the sprag clutch of FIGS. 15-19 in a locked configuration; and FIG. 21 is a cross-sectional side view of the sprag clutch of FIG. 20 in an unlocked configuration.

Figure 15:
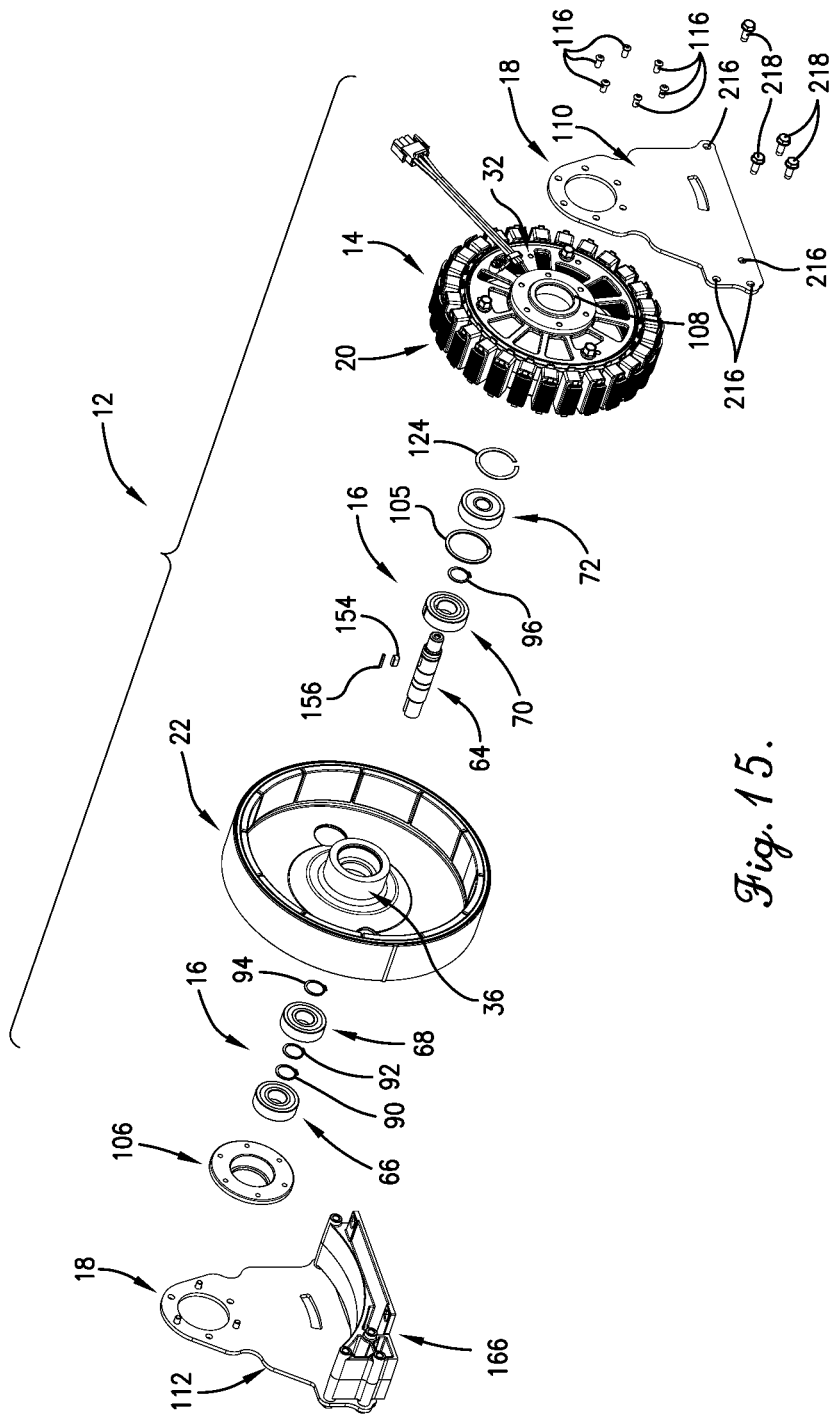
FIG. 15 is an exploded front perspective view of the assembly of FIGS. 1 and 2.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

With initial reference to FIG. 1, an appliance 10 is provided. A motor or generator assembly 12 is provided for use with the appliance 10.

In a preferred embodiment, the motor or generator assembly 12 is a generator assembly, and the appliance 10 is an exercise device such as an exercise bicycle, cross-trainer, or elliptical, as might be found in a gym or home. The generator assembly 12 preferably provides resistance to the user and also provides electrical power to operate a user interface and perhaps other electronic devices (such as a heart rate monitor), as appropriate for the particular appliance. However, alternative generator-powered appliances, including but not limited to rowing machines or non-exercise devices, are also permissible.

It is also permissible for the motor or generator assembly 12 to be a motor assembly. In one embodiment, for instance, the motor assembly might provide power to an outdoor electric bicycle.

Preferably, the assembly 12 includes a motor or generator machine 14 including a support assembly 16. The assembly 12 further includes mounting structure 18 that serves to mount the machine 14 on the appliance 10. Each of these components will be discussed in greater detail below.

Motor or Generator Machine

Figure 19:
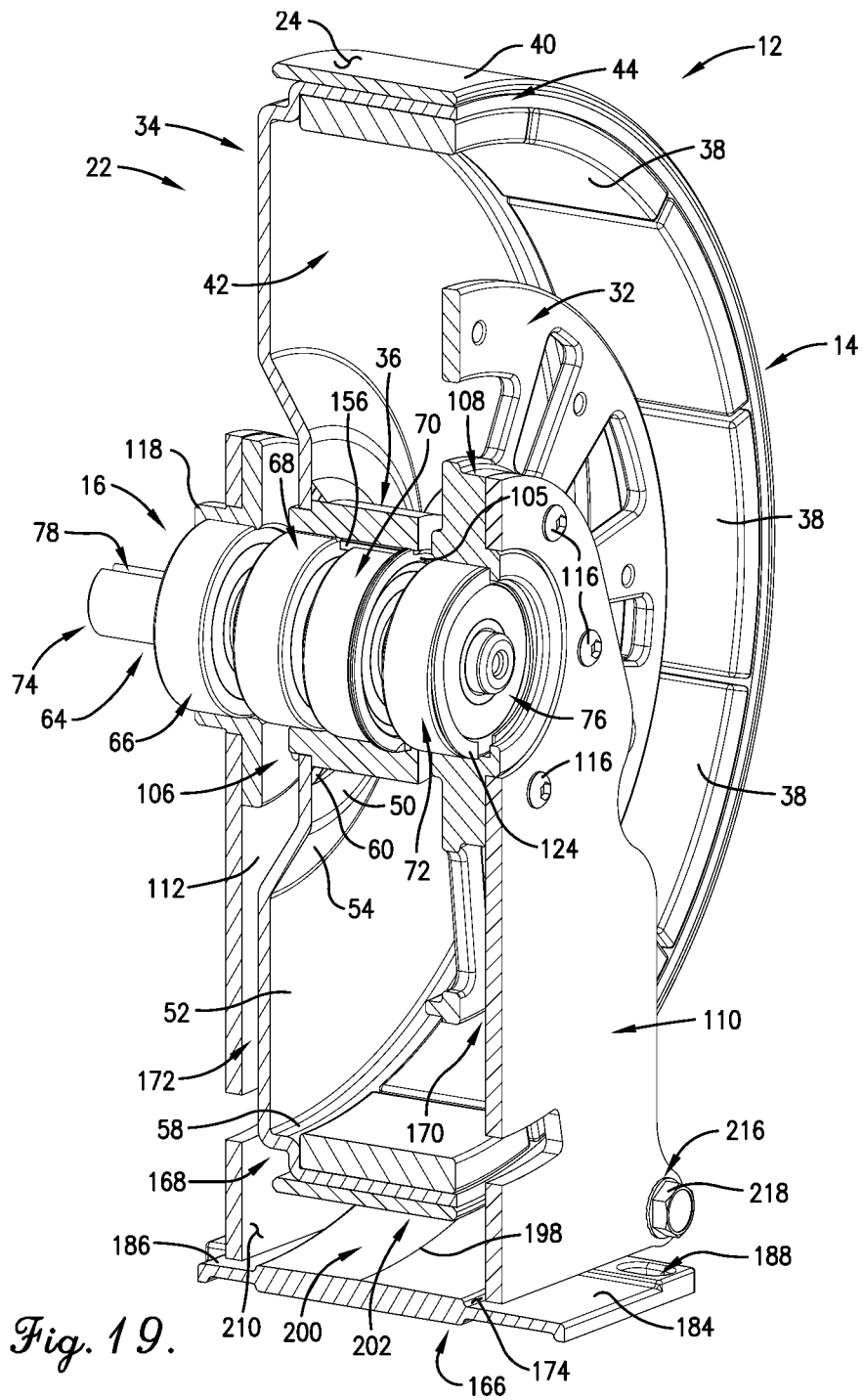
FIG. 19 is a partially sectioned front perspective view of the assembly of FIGS. 1, 2, 15, 16, and 18.

As best shown in FIGS. 1, 2, and 19, the motor or generator machine 14 includes a stator 20 and a rotor 22 rotatable about an axis. The rotor 22 is preferably an outer rotor that at least substantially circumscribes the stator 20, such that the machine is an outer rotor motor or an "inside-out" generator. Most preferably, the rotor 22 fully circumscribes the stator 20. It is permissible according to some aspects of the present invention, however, for an inner rotor to be used.

As will be discussed in more detail below and as best shown in FIGS. 1, 2, and 19, the machine 14 also preferably presents an axially extending, radially outermost circumferential machine face 24 and a pair of radially extending, axially spaced apart axial machine margins 26 and 28. Each of the axial margins 26 and 28 preferably extends radially inwardly from the circumferential face 24 and at least substantially spans the area generally defined interiorly of the circumferential face 24. In the illustrated embodiment, each axial margin 26 and 28 is substantially flat, in the sense that it is defined by structure that extends generally along a plane that is perpendicular to the rotor axis. However, the principles of the present invention are equally applicable to one or both of the axial margins having a contour, such as undulations or curved or sloped surfaces, whereby the axial margin is not a generally flat face spanning the area bounded by the circumferential face.

Although the axial machine margins 26 and 28 may be least in part structurally defined, continuous structural definition is not required according to some aspects of the present invention. Furthermore, it is permissible according to some aspects of the present invention for the axial margins to be defined in relation to structure rather by structure itself. Similarly, the circumferential face need not be continuous or defined exclusively by structure, as illustrated.

The stator 20 preferably includes a core 20a (partially shown) and wiring 20b wound about the core 20a. Lead wires 30 are preferably provided to transmit electricity to and/or from the wiring 20a as necessary for the chosen appliance.

In a preferred embodiment, the machine 14 includes an endshield 32 fixed to and supporting the stator 20. In the illustrated embodiment, the endshield 32 cooperates with the stator 20 to at least substantially define the first axial machine margin 26.

As best shown in FIGS. 11-14, the rotor 22 preferably includes a rotor can 34, a hub 36, a plurality of magnets 38, and an inertia ring 40. The can 34 preferably includes a generally radially extending base plate 42 and a generally axially extending sidewall 44 extending from the base plate 42 to present a radially innermost face 46 and a radially outermost face 48. The base plate 42 is preferably circular in shape, while the sidewall 44 is preferably cylindrical. Alternative shapes are permissible, however.

Preferably, the base plate 42 includes a radially innermost hub zone 50, a primary zone 52, and a sloped transition zone 54 radially outside if the hub zone 50 and extending between and interconnecting the hub zone 50 and the primary zone 52. More or fewer zones may be provided without departing from the scope of the present invention, however.

Preferably, the primary zone 52 in part defines the second axial machine margin 28.

In a preferred embodiment, the base plate 42 includes a plurality of ventilation openings 56 extending therethrough. However, only a single ventilation opening or even no ventilation openings might alternatively be provided. Preferably, the ventilation openings are formed primarily through the primary zone 52. Overlap into the transition zone 54 is also permissible, as is placement in entirely different and/or additional locations.

As best illustrated by FIG. 14, the sidewall 44 is preferably integrally formed with the base plate 42. Most preferably, an integral stepped region 58 interconnects the base 166 and the sidewall 44. It is permissible, however, for alternative connection means, including non-integral means, to be provided between the sidewall and the base.

In a preferred embodiment, the can 34 is a stamped rotor can. Different formation methods are permissible according to some aspects of the present invention, however. For instance, the can might alternatively be cast or at least in part machined.

Preferably, the can 34 consists essentially of steel, although other materials may be used without departing from the scope of the present invention. For instance, the can might consist essentially of cast iron or plastic or be formed of a metal alloy.

Figure 18:
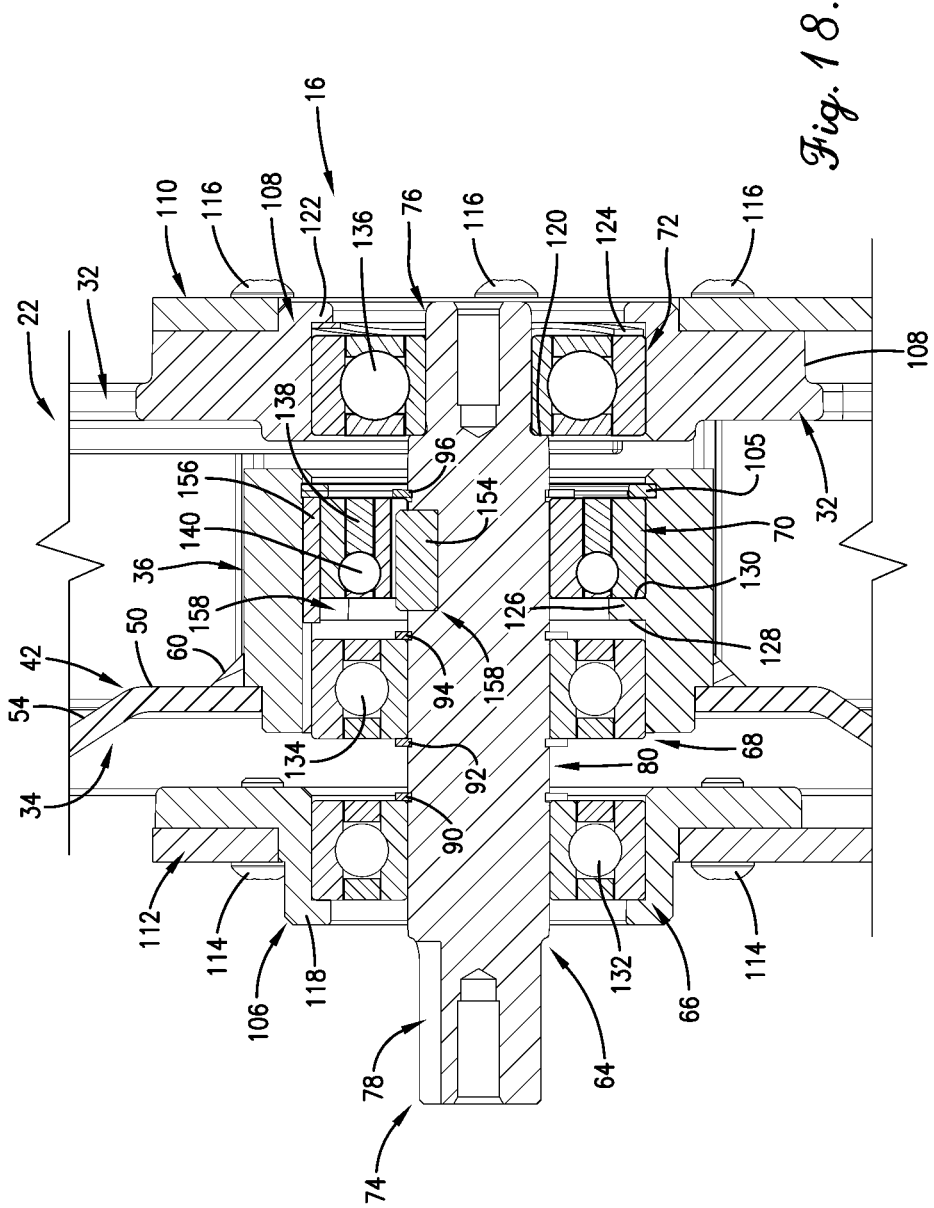
FIG. 18 is a fragmentary front cross-sectional view of the assembly of FIGS. 1, 2, 15, and 16.

A hub 36 is preferably fixed to the can 34 adjacent the hub zone 50. Most preferably, as best shown in FIGS. 11, 14, and 18, the hub 36 is welded to the can 34 along a weld line 60 to rotate therewith. However, alternative fixation means fall within the ambit of some aspects of the present invention. The hub 36 might be bolted to the can 34, for instance.

The hub 36 preferably consists essentially of steel, although use of any one or more of a variety of materials is permissible.

In a preferred embodiment and as illustrated in FIG. 11 and others, the magnets 38 are arcuately arranged along the sidewall 44 of the rotor can 34 such that the rotor can 34 at least in part supports the magnets 38. The magnets 38 are preferably permanent magnets and preferably comprise ferrite. However, any one or more of a variety of magnet types and/or materials may be used without departing from the scope of the present invention.

Preferably, the inertia ring 40 is configured to increase the rotational inertia of the rotor 22 about the axis by providing a mass that rotates with the rotor can 34 about the axis. Varying the configuration of the inertia ring 40 enables changes to the rotational inertia of the rotor 22 as a whole without complications associated with changes to the design and manufacture of the rotor can or other such complex approaches. For instance, changes to the positioning, thickness, width, and/or material of the inertia ring 40 directly impact the total rotational inertia of the rotor 22.

The inertia ring 40 is preferably non-integral with the rotor can 34 but is fixed to the rotor can 34 to rotate therewith. Such fixation may be by any means known in the art (e.g., welding, screws, glues, adhesives, or a combination thereof), although welding is preferred. Most preferably, the inertia ring 40 is welded to the sidewall 44 of the inertia can 34 along a generally axially extending weld line 62.

The inertia ring 40 preferably at least in part overlies at least one of the radially innermost and outermost faces 46 and 48 defined by the sidewall 44. Most preferably, the inertia ring 40 at least in part overlies the radially outermost face 48 and thus presents the aforementioned axially extending, radially outermost circumferential machine face 24.

Furthermore, regardless of which of the faces 46 and/or 48 are adjacent the inertia ring 40, it is preferred that the inertia ring 40 at least substantially or even fully overlies the selected face 46 and/or 48. As best shown in FIG. 14, for instance, the inertia ring 40 fully overlies and even extends axially beyond the radially outermost face 48 so as to overhang the stepped region 58.

As also best shown in FIG. 14, the sidewall 44 radial thickness and the inertia ring 40 radial thickness are preferably at least substantially similar. As noted above, however, variations to the relative thicknesses may be relatively easily made through changes to the inertia ring design. The overall rotor inertia could be easily increased, for instance, by provision of a radially thicker inertia ring.

In a preferred embodiment, the inertia ring 40 is circumferentially continuous. It is permissible according to some aspects of the present invention, however, for a discontinuous ring to be provided. For instance, the inertia ring might include perforations or be formed from a plurality of arcuately spaced apart segments.

Preferably, the inertia ring 40 consists essentially of steel, although any one or more of a variety of materials might suitably be used without departing from the scope of some aspects of the present invention. As noted above, variations to the inertia ring material provide a relatively easy means of substantially varying the rotational inertia of the rotor as a whole. A cast iron inertia ring would increase the rotational inertia relative to an aluminum inertia ring, for instance.

In a preferred embodiment, the inertia ring 40 and the rotor can 34 consist essentially of materials having substantially the same density. As noted above, for instance, it is preferred that both the inertia ring 40 and the rotor can 34 are formed essentially of steel. It is permissible according to some aspects of the present invention, however, for dissimilar densities to be used. The rotor can might be formed essentially of steel, for instance, while the inertia ring could consist essentially of iron.

It is also noted that, according to some aspects of the present invention, the inertia ring might be omitted entirely, with inertial properties of the rotor being controlled at least substantially by rotor can design or post-production machining. For instance, the rotor can might be a cast iron rotor can with a sidewall having an initially large thickness that is machined to the desired outer diameter in a finishing process.

Support Assembly

As noted previously, the motor or generator assembly 12 preferably includes a motor or generator machine 14 including a support assembly 16. The assembly 12 further includes mounting structure 18 that serves to mount the machine 14 to the appliance 10.

As best shown in FIGS. 18-19, the support assembly 16 preferably includes a shaft 64 and a plurality of bearings 66, 68, 70, and 72.

Figure 16:
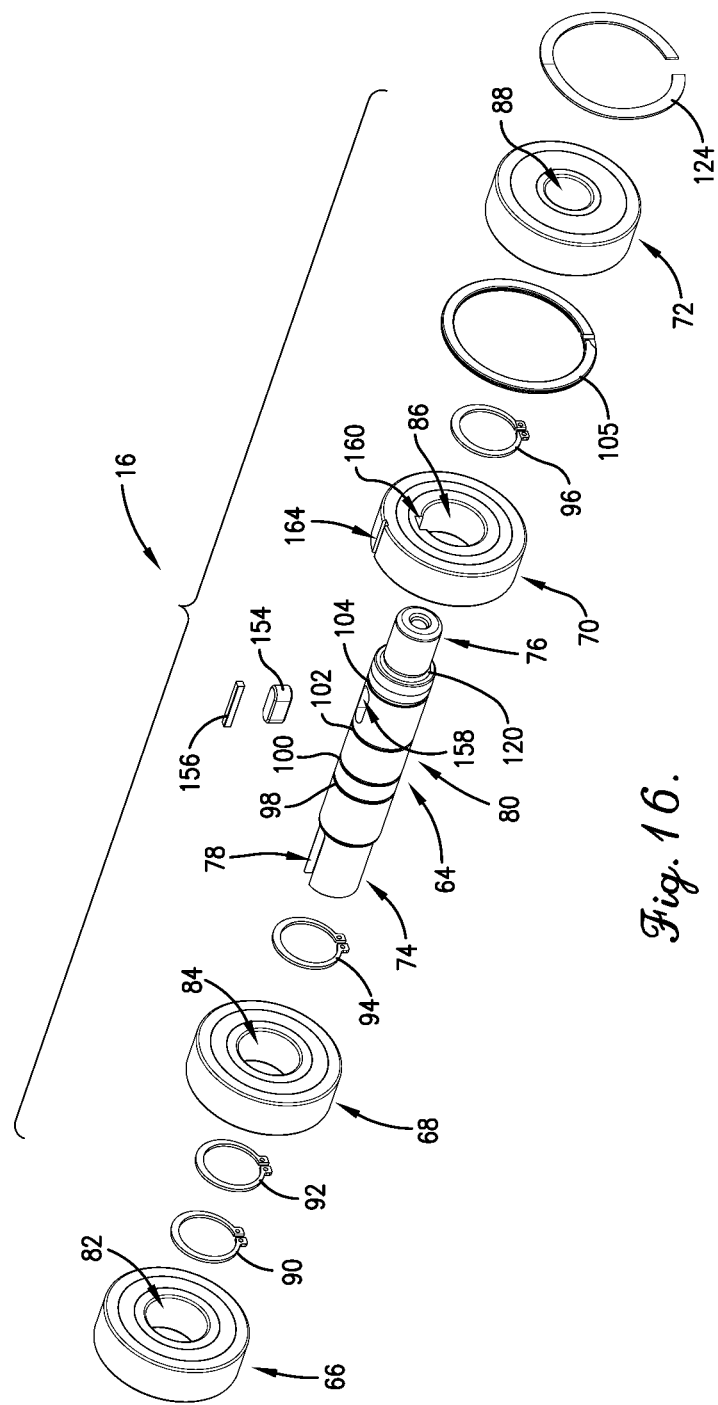
FIG. 16 is an exploded front perspective view of the shaft and bearings of the assembly of FIGS. 1, 2, and 15.
Figure 17:
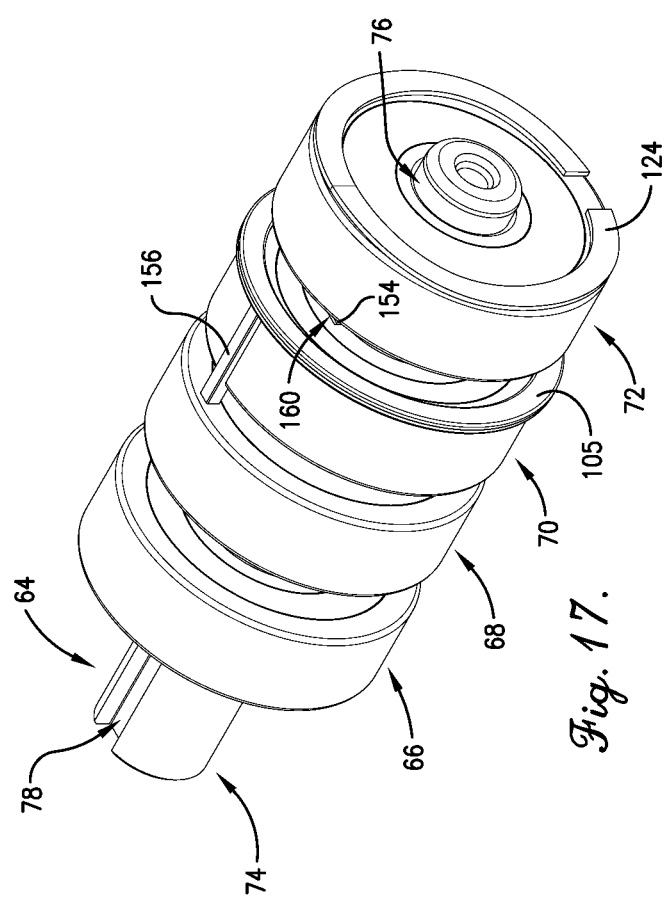
FIG. 17 is a front perspective view of the shaft and bearings of FIG. 16.

As best shown in FIGS. 16 and 18, the shaft 64 preferably presents a drive end 74 and an opposite end 76. In the preferred exercise bicycle embodiment of the appliance 10, the drive end is preferably directly or indirectly (e.g., via gearing or pulley systems) interconnected to pedals that are driven by a user, such that the user's pedaling action drives rotation of the shaft 64. In alternative embodiments, however, the drive end and opposite end connections and functionality may vary as required for the particular appliance and application. It will be appreciated that the shaft ends 74 and 76 project beyond the axial machine margins 28 and 26, respectively, even though the ends 74 and 76 are described as part of the machine 14.

The drive end 74 preferably includes a notch 78 configured for interconnection with appropriate structure to be driven. However, it is permissible for any sort of interconnection structure to be provided in addition to or as an alternative to a notch.

The shaft 64 preferably includes a middle section 80 between the drive end 74 and the opposite end 76. As will be discussed in more detail below, the middle section 80 preferably has a larger diameter than both the opposite end 76 and the drive end 74. The drive end 74 preferably has a larger diameter than the opposite end 76.

The plurality of bearings 66, 68, 70, and 72 preferably includes a drive-end bearing 66, a hub bearing 68, a one-way bearing 70, and an opposite-end bearing 72. It is permissible according to some aspects of the present invention, however, for more or fewer bearings to be provided.

Each of the bearings 66, 68, 70, and 72 preferably defines a corresponding bore 82, 84, 86, or 88. The bore 88 is preferably smaller than the bores 82, 84, and 86, as will be discussed in more detail below.

The drive-end bearing 66 preferably circumscribes the middle section 80 adjacent the drive end 74, while the opposite-end bearing circumscribes the opposite end 76. The hub bearing 68 and the one-way bearing 70 each preferably circumscribe the middle section 80 of the shaft 64 so as to be positioned between the drive-end bearing 66 and the opposite-end bearing 72.

A plurality of retaining rings 90, 92, 94, and 96 are preferably provided to help secure the bearings 66, 68, and 70 axially along the shaft 64. Preferably, the retaining rings 90, 92, 94, and 96 are snap rings, although other types of retaining rings may suitably be used.

In a preferred embodiment, a plurality of grooves 98, 100, 102, and 104 are formed in the middle section 80 of the shaft 64. Each of the retaining rings 90, 92, 94, and 96 preferably fits into a corresponding one of the grooves 98, 100, 102, and 104.

A washer 105 may also be provided for additional securement.

As best shown in FIGS. 18 and 19, the support assembly 16 preferably further includes a shaft support 106 and the endshield 32. The endshield hub 108 is secured to the mounting structure 18. The shaft support 106 is preferably positioned axially between the drive end 74 and the rotor 22. In addition, the preferred endshield hub 108 is integrally formed as part of the endshield 32, although non-integral fixation is also permissible according to some aspects of the present invention.

As will be discussed in greater detail below, the mounting structure 18 preferably includes a pair of plates or brackets 110 and 112 supporting the support assembly 16. The shaft support 106 is preferably fixed to the plate 110 by a plurality of shaft support fasteners 114, while the endshield hub 108 is fixed to the plate 112 by a plurality of endshield fasteners 116. Alternative fixation means are permissible, however, without departing from some aspects of the present invention.

As best shown in FIGS. 18 and 19, the drive-end bearing 66 is preferably mounted within the shaft support 106, while the opposite-end bearing 72 is preferably mounted within the endshield 32. The drive-end bearing 66 and the opposite-end bearing 72 preferably serve to rotatably support the shaft relative to the shaft support 106 (which is fixed to the plate 112) and the endshield 32 (which is fixed to the plate 110).

The shaft support 106 preferably includes a radially inwardly extending shaft support flange 118 that overlies a portion of the drive-end bearing 66 to prevent substantial axial shifting of the drive-end bearing 66 in the drive end 74 direction, while the retaining ring 90 provides resistance to shifting in the opposite end 76 direction.

As noted previously, the opposite end 76 preferably has a smaller diameter than the middle section 80 of the shaft 64. The opposite-end bearing 72 also preferably has a smaller bore 88 than the other bearings 66, 68, and 70. The bore 88 of the opposite-end bearing 72 is sized such that the opposite-end bearing 72 fits over the opposite end 76 but cannot fit over the middle section 80 of the shaft 64. More particularly, as shown in FIG. 18, the shaft 64 includes a shoulder 120 defined between the opposite end 76 and the middle section 80. Movement of the opposite-end bearing 72 in the drive end 74 direction is thus prevented by the shoulder 120.

The endshield hub 108 preferably includes a radially inwardly extending endshield hub flange 122 that overhangs a portion of the opposite-end bearing 72. Furthermore, the support assembly 16 preferably includes a spring washer 124 positioned between the opposite-end bearing 72 and the endshield hub flange 122. The spring washer 124 and the endshield hub flange 122 act to prevent significant axial movement of the opposite-end bearing 72 in the opposite end 76 direction. Although a spring washer is preferred, other forms of a spring may be provided according to some aspects of the present invention.

The rotor hub 36 preferably includes a divider 126 that at least substantially circumscribes the shaft 64 and presents a drive-end face 128 and an opposite-end face 130. The hub bearing 68 is preferably mounted within the rotor hub 36 adjacent the drive-end face 128, while the one-way bearing 70 is preferably mounted within the rotor hub 36 adjacent the opposite-end face 130. The bearings 68 and 70 serve to rotatably support the rotor 22 on the shaft 64, with the one-way bearing 68 also providing selective driving interconnection between the rotor 22 and the shaft 64, as will be described.

In a preferred embodiment, each of the bearings 66, 68, 72 is a ball bearing including respective sets of bearing balls 132, 134, and 136. However, other bearing types, such as needle bearings, sleeve bearings, and/or self-align bearings, are permissible according to some aspects of the present invention.

Preferably, as shown in FIG. 18, the bearing balls 136 of the opposite-end bearing 72 are larger than the bearing balls 132 and 134 of the drive-end bearing 66 and the hub bearing 68, respectively. More particularly, in the illustrated preferred embodiment, the bearings balls 132, 134, and 136 are sized such that the bearings 66, 68, and 72 have at least substantially identical outer diameters but the inner diameter of the opposite-end bearing 72 is smaller than that of the bearings 66 and 68.

Preferably, the housings and bearing balls 132, 134, and 136 of the bearings 66, 68, and 72 consist essentially of steel, although it is within the ambit of the present invention for other materials to be used.

In a preferred embodiment, the one-way bearing 70 functions both as a one-way clutch and as a load-bearing component, such that inclusion of a separate supporting bearing is not necessary in the vicinity of the one-way bearing 70. Most preferably, the one-way bearing 70 is a sprag clutch bearing such as the Boca Bearing™ CSK203PP. As shown in FIG. 18, the one-way bearing 70 in its preferred sprag clutch embodiment includes a plurality of sprags 138 and bearing balls 140 retained between an inner race 142 and an outer race 144. Preferably, the inner race 142 and the outer race 144 share the axis of rotation of the shaft 64 and the rotor 22.

FIGS. 20 and 21 schematically illustrate a radial cross-section of the one-way bearing 70 in its preferred sprag clutch configuration. A plurality of the sprags 138 are shown between the inner race 142 and the outer race 144. As will be understood by one of ordinary skill in the art, the sprags 138 are typically positioned in a cage (not shown) and may be spring-loaded (also not shown), such that the sprags are biased toward a desired position appropriate to the particular application.

FIG. 20 illustrates a locked configuration, in which rotation of the inner race 142 in a counter-clockwise direction (referred to hereinafter with respect to FIGS. 20 and 21 as the forward direction) results in transmission of torque from the inner race 142 to the outer race 144 through the sprags 138, such that the outer race 144 rotates forward with the inner race 142. Conversely, rotation of the outer race 144 in a clockwise direction (referred to hereinafter with respect to FIGS. 20 and 21 as the backward direction) transmits torque from the outer race 144 to the inner race 142 through the sprags 138, such that the inner race 142 rotates backward with the outer race 144.

More particularly, the inner race 142 presents an inner race contact surface 146, and the outer race 144 presents an outer race contact surface 148. Each sprag 138 presents an inner sprag contact surface 150; an outer sprag contact surface 152; and an individual rotation or tilt axis extending therethrough, preferably parallel to the axis of rotation of the shaft 64. Due to the interacting shapes of the contact surfaces 146,150 and 148,152, forward rotation of the inner race 142 (or backward rotation of the outer race 144) urges the sprags 138 to tilt or rotate backward (clockwise), thus increasing their radial heights and creating radial forces between the sprag contact surfaces 150,152 and the race contact surfaces 146,148, respectively, to effectively jam or lock the inner and outer races 142 and 144 to the sprags 138 (and thus to each other) via friction. The inner and outer races 142 and 144 thus rotate generally in unison about the shaft 64 axis.

Furthermore, as is also apparent from FIG. 20, forward (counter-clockwise) rotation of the inner race 142 relative to the outer race 144 is generally prevented by the jamming or locking action of the sprags 138. From an alternative perspective, backward (clockwise) rotation of the outer race 144 relative to the inner race 142 is generally prevented. For instance, within a reasonable tolerance, the outer race 144 cannot rotate forward more slowly than the inner race 142, nor can the outer race 144 remain stationary or rotate backward while the inner race 142 rotates forward. Yet further, the outer race 144 cannot rotate backward while the inner race 142 remains stationary. Likewise, within a reasonable tolerance, the inner race 142 cannot rotate backward more slowly than the outer race 144, nor can the inner race 142 remain stationary or rotate forward while the outer race 144 rotates backward. Yet further, the inner race 142 cannot rotate forward while the outer race 144 remains stationary.

In contrast, FIG. 21 illustrates an unlocked configuration, in which backward (clockwise) rotation of the inner race 142 relative to the outer race 144 generally does not result in transmission of torque from the inner race 142 to the outer race 144 through the sprags 138. From an alternative perspective, forward (counter-clockwise) rotation of the outer race 144 relative to the inner race 142 generally does not result in transmission of torque from the outer race 144 to the inner race 142 through the sprags 138. That is, torque transmission is generally prevented, such that the inner and outer races 142 and 144, respectively, are not required to rotate in unison about the shaft 64 axis.

More particularly, due to the interacting shapes of the contact surfaces 146,150 and 148,152, backward rotation of the inner race 142 relative to the outer race 144 (or, equivalently, rotation of the outer race 144 relative to the inner race 142) urges the sprags 138 to tilt or rotate forward (counter-clockwise), thus decreasing their radial heights and at least substantially eliminating the radial forces between the sprag contact surfaces 150,152 and the race contact surfaces 146,148, respectively, so as to generally free the inner and outer races 142 and 144 and the sprags 138 relative to each other. The inner and outer races 142 and 144 thus rotate generally freely relative to each other about the shaft 64 axis.

Thus, torque is generally not transmitted between the inner and outer races 142 and 144 when the outer race 144 rotates in the forward direction faster than the inner race 142, nor is torque generally transmitted when the outer race 144 rotates in the forward direction and the inner race 142 is either stationary or rotates backwards. Likewise, torque is generally not transmitted between the inner and outer races 142 and 144 when the inner race 142 rotates in the backward direction faster than the outer race 144, nor is torque generally transmitted when the inner race 142 rotates in the backward direction and the outer race 144 is either stationary or, as previously stated, rotates forward.

In a preferred embodiment, the support assembly 16 further includes a shaft key 154 and a rotor key 156. The shaft key 154 preferably fixedly interconnects the shaft 64 and the inner race 142 such that the shaft 64 and the inner race 142 rotate generally simultaneously. Similarly, the rotor key 156 preferably fixedly interconnects the outer race 144 and the rotor 22 such the outer race 144 and the rotor 22 rotate generally simultaneously. Thus, operation of the one-way bearing 70 as described in detail above influences not only the rotation of the inner and outer races 142 and 144, respectively, but also the rotation of the shaft 64 and the rotor 22.

More particularly, as best shown in FIGS. 16 and 18, a shaft depression 158 is formed in the shaft 64. As best shown in FIGS. 16, 18, 20, and 21, an inner race notch 160 is formed in the inner race 142. The shaft key 154 is cooperatively retained in the shaft depression 158 and the inner race notch 160.

Furthermore, as best shown in FIGS. 13, 14, and 18, a hub notch 162 is formed in the hub divider 126. As best shown in FIGS. 16-21 and others, an outer race notch 164 is formed in the outer race 144. The rotor key 156 is cooperatively retained in the hub notch 162 and the outer race notch 164.

It is permissible, however, for alternative interconnection means to be provided as alternatives to or in addition to the keys 154 and 156. For instance, adhesives, welding, or press fits might be used, or latches and/or pegs might be provided.

In view of both the above-described detailed descriptions of the operation of the one-way bearing 70 and the interconnection of the inner and outer races 142 and 144 to respective ones of the shaft 64 and rotor 22, it is readily apparent to one of ordinary skill in that art that several general statements may be made regarding the configuration of the one-way bearing 70 and its effects on the shaft 64 and the rotor 22. For instance, in a preferred embodiment, the one-way bearing 70 is configured such that the shaft 64 generally transmits torque to the rotor 22 when the shaft 64 rotates in a first direction and the rotor 22 does not rotate in the first direction relative to the shaft—that is, when the rotor 22 is not rotating faster than the shaft 64 in the first direction. In the preferred exercise bicycle embodiment, for instance, the shaft 64, when rotating forward as a result of a user pedaling, would generally drive the rotor 22 that is also spinning in the forward direction at an least generally equal rotational speed as the shaft.

The one-way bearing 70 is also preferably configured such that the shaft 64 is generally prevented from transmitting torque to the rotor 22 when shaft 64 rotates in a second direction opposite the first direction. Again considering the preferred exercise bicycle embodiment, the shaft 64, when rotating backward as a result of a user backpedaling, generally would not transmit torque to the rotor 22. A forward-spinning rotor 22 would be generally free to continue rotating forward, for instance.

The one-way bearing 70 is also preferably configured such that the shaft 64 is generally prevented from transmitting torque to the rotor 22 when both components rotate in the first direction but the rotor 22 rotates generally faster than the shaft 64 (i.e., the rotor 22 "freewheels"). Continuing the exercise bicycle analogy, such freewheeling of the rotor 22 might occur if one were to, for instance, pedal quickly for several seconds, then slow the pedaling rate such the shaft 64 and the rotor 22 are both rotating forward but the rotor 22 is rotating forward faster than the shaft 64. Once the rotor 22 has slowed to generally the same speed as the shaft 64 due to friction and other forces, the shaft 64 would then again drive the rotor 22.

Yet further, the one-way bearing is preferably configured such that rotation of the shaft 64 in the first direction relative to the rotor 22 is generally prevented. In the exercise bicycle analogy, for instance, the rotor 22 is generally prevented from rotating forward more slowly than forward-moving pedals, assuming direct interconnection of the pedals and the shaft (such that one revolution of the pedals results in one revolution of the shaft). Similarly, the rotor 22 generally cannot be stationary or rotating backward while the pedals move forward. Likewise, if the rotor 22 is spinning backward, the pedals generally cannot spin forward, remain stationary, or even spin backward more slowly than the rotor 22.

As will be readily apparent to one of ordinary skill in the art, the above scenarios can also be presented from a rotor-centric perspective. For instance, the one-way bearing 70 is configured such that the rotor 22 transmits torque to the shaft 64 when the rotor 22 rotates in the second direction and the shaft 64 does not rotate in the second direction relative to the rotor 22. The one-way bearing 70 is also configured such that the rotor 22 is prevented from transmitting torque to the shaft 64 when the rotor 22 rotates in the first direction. Yet further, the one-way bearing 70 is configured such that the rotor 22 is prevented from transmitting torque to the shaft 64 when both the rotor 22 and the shaft 64 rotate in the second direction but the shaft 64 rotates faster than the rotor 22.

In a preferred embodiment, the components of the support assembly 16 as described above are configured such that the support assembly 16 may be assembled by hand. For instance, the bearing bores 82, 84, 86, and 88 are preferably sized for slip fits relative to the relevant portions of the shaft 64. However, it is permissible for press fits or other fits not conducive to hand assembly to be used in alternative embodiments.

Furthermore, the support assembly 16 can preferably be assembled blind. It is permissible, however, for modifications that fall within the scope of the present invention to be made that will result in blind assembly becoming impossible.

Mounting Structure

As will be discussed in greater detail below and as best shown in FIGS. 1 and 2, the mounting structure 18 preferably includes a base 166 configured for attachment to the appliance 10. The mounting structure 18 also preferably includes the aforementioned pair of at least substantially radially extending plates or brackets 110 and 112, which are fixed to the base 166. The plates 110 and 112 preferably at least in part define a machine-receiving space 168 therebetween, with the machine 14 being mounted on the plates 110 and 112 so as to be positioned at least in part in the machine-receiving space 168. More particularly, the plates 110 and 112 preferably extend at least in part adjacent respective ones of the previously described axial machine margins 26 and 28, while the base 166 is preferably positioned at least substantially radially outside the outermost circumferential machine face 24. That is, the machine 14 is supported in a cantilevered manner relative to the base 166.

Preferably, the machine 14 is mounted relative to the plates 110 and 112 such that respective gaps or spaces 170 and 172 defined between the plates 110 and 112 and the axial margins 26 and 28 of the machine 14 are at least substantially similar. That is, the machine 14 is preferably substantially centered between the plates 110 and 112.

It will be appreciated by those of ordinary skill in the art that shims are conventionally used between the opposing generally circumferential faces of the rotor and stator of a given machine to position the rotor and the stator relative to each other during fabrication, assembly, and/or mounting. For an outer rotor motor, for instance, shims might be provided between the outer face of the stator and the adjacent inner face of the rotor. However, it is preferred that fabrication, assembly, and mounting of the inventive machine 14 is achieved without the use of shims, at least in part due to the advantages provided by the base 166 design described in detail below. It is permissible according to some aspects of the present invention, however, for shims to be used.

Preferably, the base 166 is cast or molded. More particularly, the base 166 preferably comprises metal that is die cast. It is permissible according to some aspects of the present invention, however, for the base to be alternatively formed. For instance, the base might be formed by a combination of casting and molding, and/or it might be in whole or in part formed by machining Furthermore, the base might alternatively comprise a different material, such as plastic.

In a preferred embodiment best illustrated by FIGS. 3-10, the base 166 presents a pair of axially spaced apart, at least substantially parallel side faces 174 and 176 and a split draft face 178 extending between and interconnecting the side faces 174 and 176. The split draft face 178 will be discussed in particular detail below.

The base 166 preferably further presents a bottom face 180 opposite the split draft face 178 and extending between and interconnecting the side faces 174 and 176. The bottom face 180 is preferably at least substantially perpendicular to the side faces 174 and 176.

In a preferred embodiment, the base 166 includes a base flange 182 configured for connection to the appliance 10. The base flange 182 preferably includes a pair of base flange sections 184 and 186, each of which projects axially beyond a corresponding one of the side faces 174 and 176 and each of which includes a plurality of base fastener-receiving slots 188 to receive base fasteners (not shown) for attachment to the appliance 10.

The split draft face 178 preferably includes a first portion 190 adjacent the side face 174 and a second portion 192 adjacent the side face 176. The split draft face 178 also preferably includes a front region 194 and a back region 196. As best shown in FIGS. 7 and 8, the first and second portions 190 and 192, respectively, are preferably angled with respect to each other and adjoin along a draft or parting line 198. More particularly, the first and second portions 190 and 192 each are preferably angled away from the draft line 198 toward the bottom face 180. In a preferred embodiment, such a configuration is advantageous for easing the removal of the base 166 from a mold.

The draft or parting line 198 is preferably at least substantially equidistant from the side faces 174 and 176, such that the first and second portions 190 and 192 have at least substantially the same widths. Furthermore, the draft line 198 is preferably straight. It is permissible according to some aspects of the present invention, however, for an offset, curved, stepped, and/or zig-zagged draft line to be provided.

In a preferred embodiment, the first and second portions 190 and 192 of the split draft face 178 preferably cooperatively define a concave curved region 200 of the base 166. As best shown in FIGS. 1, 2, and 19, the curved region 200 and the previously described outermost circumferential machine face 24 are preferably at least substantially concentric. In a preferred embodiment, a substantially constant radial gap 202 is thus maintained between the base 166 and the machine 14 regardless of the rotational position of the rotor 22.

As best shown in FIGS. 3 and 4, in a preferred embodiment, each of the side faces 174 and 176 preferably presents an at least substantially flat abutment region 204 or 206, respectively. Furthermore, as best shown in FIG. 19, each bracket or plate 110,112 preferably presents a respective at least substantially flat axially inner face 208 or 210. A portion of each axially inner face 208 or 210 preferably abuts a respective one of the abutment regions 204 or 206 such that the abutment regions 204 and 206 and the inner faces 208 and 210 are at least substantially parallel.

Provision of the draft line 198 on the split draft face 178 enables formation of the at least substantially flat abutment regions 204 and 206 via casting or molding and without the need for machining, thus decreasing the production costs associated with the base 166. Preferably, the entire base 166 is formed without machining, although it is permissible according to some aspects of the present invention for the abutment regions and/or other portions of the base to be machined.

In a preferred embodiment, the base 166 defines a plurality of connection locations 212 comprising a plurality of fastener-receiving holes 214. The plates 110 and 112 preferably define a corresponding plurality of plate holes 216. The plates 110 and 112 are preferably secured to the base 166 using discrete plate fasteners 218 extending through corresponding ones of the plate holes 216 into corresponding ones of the fastener-receiving holes 214 in the base 166, such that the plate inner faces 208 and 210 abut the abutment regions 204 and 206 of the sides faces 174 and 176 in the manner described above.

More particularly, as shown in FIGS. 3, 4, and others, a first set 214a of fastener-receiving holes 214 is preferably defined in the first side face 174, while a second set 214b of fastener-receiving holes is defined in the second side face 176. Likewise, a first group 216a of plate holes 216 is preferably formed in the first plate 110, while a second group 216b of plate holes 216 is formed in the second plate 112.

As shown in FIGS. 9 and 10, the fastener-receiving holes 214 are preferably blinds. That is, they preferably do not extend through the entirety of the base 166.

Preferably, the plate holes 216 are sized such that only a small clearance is provided for the plate fasteners 218. Such small clearance is conducive toward the preferred shimless motor configuration briefly described above. It is permissible according to some aspects of the present invention, however, for larger clearances to be used.

Although the above-described securement configuration is preferred, alternative means of securing the plates to the base fall within the scope of some aspects of the present invention. For instance, the plate fasteners might not be discrete but instead be in the form of pegs extending from the plates, or latches and/or adhesives might be used to secure the components to one another. It is also permissible for through holes to be provided in the base.

The motor or generator assembly 12 preferably exhibits good parallelism and perpendicularity of components at least in part due to the advantages provided by the preferred base 166 described in detail above. For instance, those of ordinary skill in the art will appreciate that the base 166 is robust and substantially solid, which has been determined to significantly reduce the warping of the plates 110 and 112 and consequent irregularities in the mounting of the machine 14 relative to the plates 110 and 112.

Yet further, the base 166 preferably establishes a reference plane (that defined by the bottom face 180 of the base 166, for instance) from which other components of the machine can be positioned. For instance, the shaft 64 is preferably positioned such that its centerline extends generally parallel to the plane defined by the bottom face 180.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention set forth in the following claims.

What is claimed is:

1. A motor or generator assembly for use with an appliance, said motor or generator assembly comprising:
   a motor or generator machine including—
      a rotor rotatable about an axis, and
      a stator,
      said machine presenting an axially extending, radially outermost circumferential face,
      said machine presenting a pair of axially spaced apart axial margins, each of which projects generally radially inwardly from the circumferential face; and
   mounting structure supporting the machine on the appliance, said mounting structure including—
      a pair of at least substantially radially extending plates, said plates at least in part defining a machine-receiving space therebetween,
      said machine being mounted on said brackets so as to be positioned at least in part in said machine-receiving space,
      said plates extending at least in part adjacent respective ones of said axial margins, and
      a base positioned at least substantially radially outside the circumferential face of the machine,
      said base being configured for connection to the appliance,
      said base presenting a pair of axially spaced apart side faces, with each of the plates being secured against a respective one of the side faces,
      said base being a cast or molded base presenting a split draft face extending between and interconnecting the side faces,
      said split draft face including a first portion adjacent a first one of the side faces and a second portion adjacent a second one of the side faces,
      said first and second portions being angled with respect to each other,
      said first portion abutting said second portion along a draft line.

2. The motor or generator assembly of claim 1,
   said base further presenting a bottom face opposite the split draft face and extending between and interconnecting the side faces.

3. The motor or generator assembly of claim 1,
   said draft line being at least substantially equidistant from the first one of the side faces and the second one of the side faces,
   said draft line being straight.

4. The motor or generator assembly of claim 1,
   said split draft face including a curved region,
   said curved region being concave about the axis of rotation.

5. The motor or generator assembly of claim 4,
   said curved region and said outermost circumferential face being at least substantially concentric.

6. The motor or generator assembly of claim 4,
   said split draft face further including a front region and a back region,
   said curved region extending between and interconnecting said front region and said back region.

7. The motor or generator assembly of claim 1,
   said base comprising metal that is die cast.

8. The motor or generator assembly of claim 1,
   each of said side faces presenting an at least substantially flat abutment region,
   each of said plates presenting an at least substantially flat axially inner face,
   a portion of each axially inner face abutting a respective one of the abutment regions.

9. The motor or generator assembly of claim 8,
   said abutment regions and said inner faces being at least substantially parallel.

10. The motor or generator assembly of claim 8,
    said abutment regions being formed without machining.

11. The motor or generator assembly of claim 1,
    each of said axial margins of the machine and an adjacent one of the plates defining a space therebetween, with the spaces being substantially similar.

12. The motor or generator assembly of claim 1,
    said motor or generator assembly being devoid of shims.

13. The motor or generator assembly of claim 1,
    said rotor at least in part circumscribing the stator,
    said rotor defining the circumferential face.

14. The motor or generator assembly of claim 1,
said base including a flange configured for connection to the appliance.

15. The motor or generator assembly of claim 14,
said flange including a pair of flange sections,
each of said flange sections projecting axially beyond a corresponding one of the side faces.

16. The motor or generator assembly of claim 1,
said base defining a plurality of connection locations,
said plates being secured to the base at said connection locations.

17. The motor or generator assembly of claim 16,
said connection locations comprising a plurality of fastener-receiving holes,
said mounting structure further including a plurality of fasteners extending into corresponding ones of said fastener-receiving holes to secure said plates.

18. The motor or generator assembly of claim 17,
said plurality of fastener-receiving holes including a first set of fastener-receiving holes defined in a first one of the side faces and a second set of fastener-receiving holes defined in a second one of the side faces.

19. The motor or generator assembly of claim 17,
said plates defining a plurality of plate holes corresponding to the fastener-receiving holes,
said fasteners extending through said plate holes to secure said plates.

* * * * *